United States Patent [19]

Saitoh et al.

[11] Patent Number: 4,518,988
[45] Date of Patent: May 21, 1985

[54] TWO-COLOR COPYING MACHINE

[75] Inventors: Hiroyuki Saitoh; Masami Kurata, both of Kanagawa, Japan

[73] Assignee: Fuji Xerox Company, Limited, Tokyo, Japan

[21] Appl. No.: 482,642

[22] Filed: Apr. 6, 1983

[30] Foreign Application Priority Data

Apr. 6, 1982 [JP] Japan ................................ 57-55997

[51] Int. Cl.$^3$ .............................................. H04N 1/40
[52] U.S. Cl. ................................................. 358/75
[58] Field of Search ...................... 358/75; 355/4, 32; 346/76 PH

[56] References Cited

U.S. PATENT DOCUMENTS 4,442,452  4/1984  Kurata et al. .......................... 358/75
4,479,242  10/1984  Kurata et al. .......................... 358/75

Primary Examiner—Michael A. Masinick
Attorney, Agent, or Firm—Sughrue, Mion, Zinn, Macpeak and Seas

[57] ABSTRACT

A two-color copying machine performs two scannings of an original to supply image data respecting the original to an image sensor. In one of the scans, a complementary color filter is inserted in the optical path to absorb a particular chromatic color. Achromatic printing is carried out using the image signal generated without the filter, while printing in the chromatic color is carried out using a combined image signal generated with said complementary filter in place.

9 Claims, 6 Drawing Figures

TWO-COLOR COPYING MACHINE

BACKGROUND OF THE INVENTION

This invention relates to a two-color copying machine of the type which copies data according to a transfer type heat-sensitve recording system, and more particularly to a two-color copying machine for copying data in two colors; an achromatic color and a particular chromatic color.

A two-color copying machine for copying an original in two colors; an achromatic color and a particular chromatic color, has been proposed in the art. If it is assumed that the particular chromatic color is red, then, in the proposed two-color copying machine, image data in the achromatic color (black) and image data in red on an original are separately read, and the black image data is recorded in black ink while the red data is recorded in red ink, to obtain the image in two colors.

In recording an original, it is impossible to optically separate image data of only a particular chromatic color (red) from other image data. Therefore, heretofore, the light beam passed through the original or reflected from the original has been split into two light beams, and the two light beams then changed in wavelength component from one another by wavelength selection means such as filters. In the case of reading two colors; black and red, a cyan filter, the color of which is complementary to red, is disposed in one optical path, and no filter is disposed in the other optical path.

When red image data is read with this arrangement, in the optical path having the cyan filter, no light passes through the cyan filter and no light is detected by an image sensor on the image forming surface. The same can be said of reading black image data. When image data in any other color is input, the image sensor detects a light beam which has passed through the cyan filter. When light which does not pass through the cyan filter corresponds to image data to be recorded, then the image sensor disposed in this optical path detects the sum of the black (achromatic) and red (chromatic) image data.

On the other hand, in the optical path having no filter, the image sensor detects no light only when the black image data is read. That is, the image sensor in the optical path detects only black (achromatic) image data.

The different image signals from the two image sensors are electrically processed, to obtain a red (chromatic) image signal. Accordingly, the conventional two-color copying machine needs not only two image sensors but also a separating circuit for electrically separating a chromatic color. That is, the conventional two-color copying machine is disadvantageous in that the image data reading mechanism is intricate and expensive.

SUMMARY OF THE INVENTION

In view of the foregoing, an object of this invention is to provide a two-color copying machine in which two colors, namely, an achromatic color and a chromatic color, are read using a simple image data reading section, and are recorded.

In the invention, an optical filter, the color of which is complementary to a particular chromatic color to be read, is employed. A light beam passing through the filter and a light beam not passing through the filter are both converted into image signals using one image sensor in a time division manner, so that first an image signal of the achromatic color is obtained, followed by an image signal of the sum of the achromatic and chromatic colors. With the aid of the image signal of the achromatic color, dual-structure ink donor sheets which have achromatic and chromatic ink layers, respectively, are selectively heated, so that the achromatic ink is transferred onto the recording sheet. Then, the ink donor sheet having the chromatic ink layer is placed on the recording sheet after being separated from the other ink donor sheet, and is then selectively heated with the aid of the image signal of the sum of the achromatic and chromatic colors, so that the chromatic color is transferred onto the recording sheet. Thus, recording is achieved in the two colors, while achieving the object of the invention.

BRIEF DESCRIPTION OF THE DRAWINGS

FIGS. 1 through 5 are diagrams for describing one embodiment of this invention, wherein:

FIG. 1 is an explanatory diagram outlining the arrangement of a reading section of a two-color copying machine according to the invention;

FIG. 2 is an explanatory diagram outlining the arrangement of a recording section of the copying machine;

FIG. 3 is an explanatory diagram showing the structure of ink donor sheets laid one on another, which are used in the two-color copying machine;

FIG. 4 is a diagram describing data recording in the black recording section;

FIG. 5 is a diagram describing data recording in a red recording section; and,

DETAILED DESCRIPTION OF THE PREFERRED EMBODIMENTS

Figure 1:
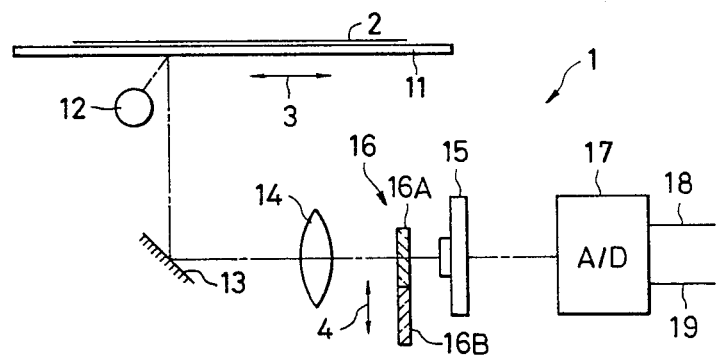

FIG. 1 shows the reading section of a two-color copying machine which records data in two colors according to one embodiment of the invention. An original 2 is placed on the platen 11 in the reading section in a manner such that its reading surface faces downwardly. That platen 11 is reciprocated in the direction of the arrows 3 (in the auxiliary scanning direction) by drive means (not shown). One fluorescent lamp 12 extends perpendicular to the direction of the arrows 3, to illuminate the reading region of the original 2. A light beam reflected from the original 2 is bent by a mirror and then applied to a lens 14, so that the image of the original is formed on an image sensor 15. Reading elements are arranged in one line on the image-forming surface of the image sensor 15, so that data are read line by line as the platen 11 is scanned in the auxiliary direction.

A wavelength selector 16 is disposed in the optical path and between the lens 14 and the image sensor 15. The selector 16 is moved vertically (in the direction of the arrows 4) by a solenoid (not shown). When the platen 11 carries out its first auxiliary scan (to the right in FIG. 1), the upper transparent filter 16A is moved into the optical path. When the platen 11 carries out its second auxiliary scan, the lower cyan filter 16B is moved into the optical path.

A binary-encoding circuit 17 receives the analog image signal 18 which the image sensor 15 outputs for every line when auxiliary scanning is carried out, and subjects is to binary encoding. When the first auxiliary scan is carried out, the binary-encoding circuit 17 outputs a black image signal 18. Similarly when the second auxiliary scan is carried out, the binary-encoding circuit 17 outputs a black and red mixed image signal 19 as a digital signal.

Figure 2:
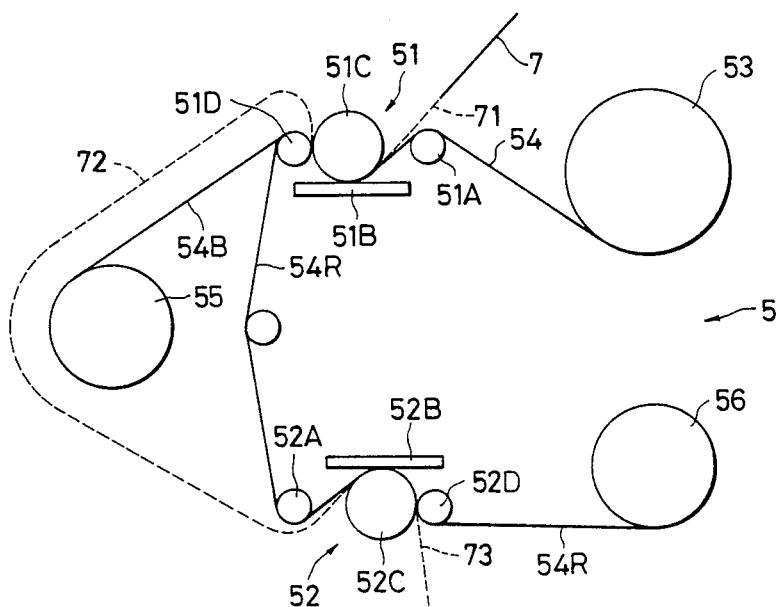
Figure 3:
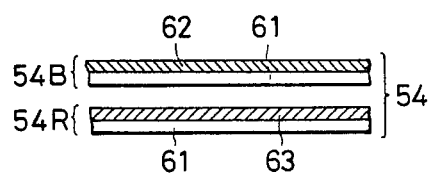

FIG. 2 shows a recording section of the two-color copying machine. The recording section 5 comprises a black recording section 51 and a red recording section 52. An ink donor sheet 54 is supplied from a supply roll 53 through a guide roll 51A to the black recording section 51. The ink donor sheet 54, as shown in FIG. 3, comprises a black ink donor sheet 54B and a red ink donor sheet 54R which are laid one on another. The upper black ink donor sheet 54B is formed by coating the upper surface of a base sheet 61 with a thermally transferrable black ink 62. The lower red ink donor sheet 54R is formed by coating the upper surface of a base sheet 61 with a thermally transferrable red ink 63. These thermally transferrable inks are solid at room temperature, but are fluidized or sublimated at a predetermined temperature.

The ink donor sheet 54 supplied to the black recording section passes between a thermal head 51B and a back roll 51C and between the back roll 51C and a drive roll 51D, and is then separated into the black ink donor sheet 54B and the red ink donor sheet 54R. The black ink donor sheet 54B is then wound on a winding roll 55. The red ink donor sheet 54R passes between a thermal head 52B and a back roller 52C while being guided by a guide roll 52A and goes between the back roller 52C and a drive roller 52D. Finally the red ink donor sheet 54R is wound on a winding roll 56.

The operation of the two-color copying machine thus constructed will now be described.

The operator places an original 2 on the platen 11. When, in this condition, the operator depresses the start button, the fluorescent lamp 12 is turned on and one recording sheet (an ordinary sheet) 7 is supplied from a sheet supply tray (not shown) (FIG. 2). More specifically, the sheet 7 is moved along the path indicated by the broken line 71 in FIG. 2 to near the back roller 51 in the black recording section. When a sensor (not shown) detects the front edge of the recording sheet 7, the two drive rollers 51D and 52D are driven and simultaneously the back rollers 51C and 52C are rotated. At the same time, the supply roll 53 starts supplying the ink donor sheet 54. The recording sheet 7 is moved over the thermal head 51B while being held between the ink donor sheet 54 and the back roller 51C. When the front edge of the recording sheet 7 reaches the thermal head 51B, the platen starts the auxiliary scan so that the original 2 is read beginning with one end. Thus, the black image signal 18 is output.

Figure 4:
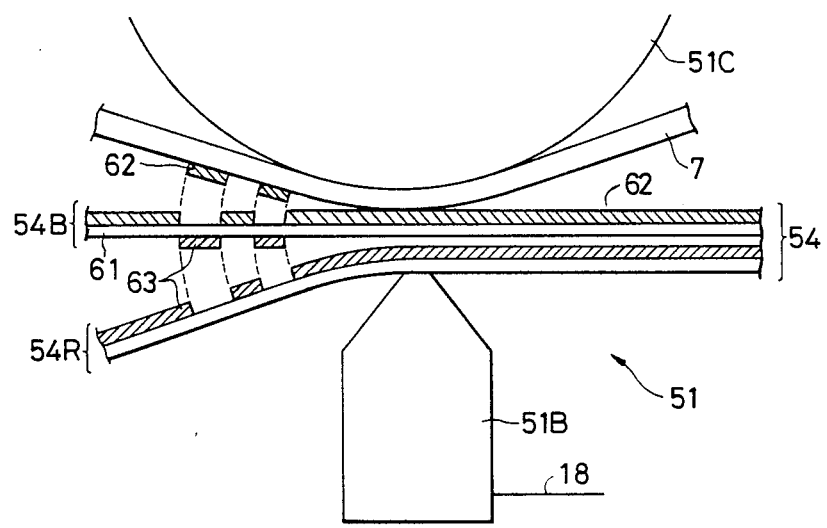

FIG. 4 shows data recording in the black recording section under the above-described conditions. The recording sheet 7 passes between the thermal head 51B and the back roll 51C while being placed on the black ink layer 62 of the ink donor sheet 54. When, during this period, the thermal head 51B is driven by the black image signal for one line, the ink donor sheet 54 is supplied with a thermal pulse at positions corresponding to black image data. As a result, the black ink 62 at these positions is transferred onto the recording sheet 7, thus recording the data in black. At the same time, the red ink 63 at the same positions is fluidized or sublimated so as to be transferred onto the rear surface of the base sheet 61 of the black ink donor sheet 54B. That is, the red ink donor sheet 54R lacks red ink 63 only at those positions corresponding to black image data.

The recording sheet 7 and the ink donor sheet 54 are separated from each other when passing through the drive roll 51D. The red ink donor sheet 54R is further conveyed at a constant speed. However, the sheet 54R is stopped immediately when the end portion thereof which was used for recording passes over the guide roll 52. At the same time, the black ink donor sheet is also stopped.

On the other hand, the recording sheet 7 is moved along a path outside the winding roll 54 to the red recording section 52 as indicated by the broken line 72. When the front edge of the recording sheet 7 passes through the guide roll 52, the drive rolls 51D and 52D are driven. Accordingly, the recording sheet 7 passes between the thermal head 52B and the back roller 52C while being placed on the red ink donor sheet 54R. When the front edge of the recording sheet 7 reaches the thermal head 52B, the platen 11 starts the second auxiliary scan. The original 2 is read starting with the same end again, and the black and red mixed image signal 19 is outputted by the binary-encoding circuit 17.

Figure 5:
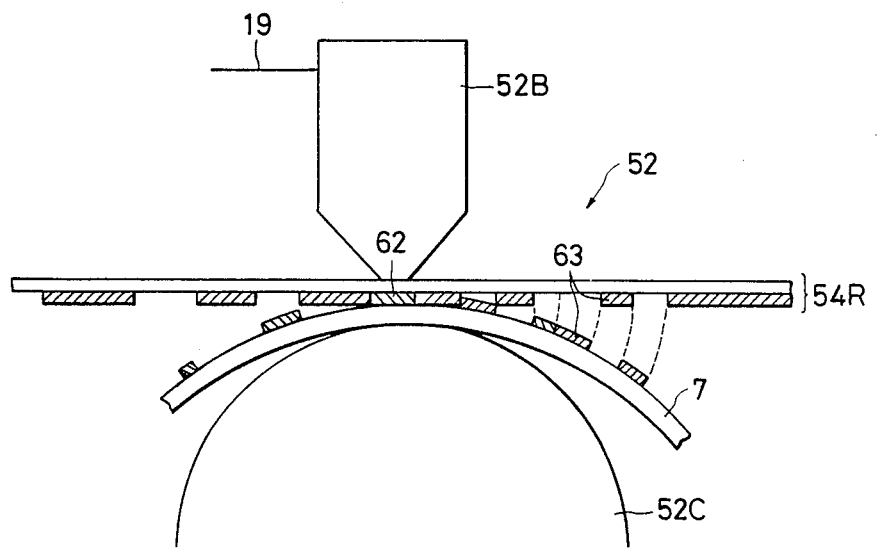

FIG. 5 shows data recording in the red recording section under the above-described conditions. The black and red mixed image signal is such that when black or red image data on the original is read, the data is recorded (or printed) at a position on the recording sheet which corresponds to that of the data thus read. It is first assumed that black image data on the original is read. In this case, a heat generating element corresponding in position to the data thus read is activated in the thermal head 52B. The red ink for this position has already been transferred from the red ink donor sheet 54R to the black ink donor sheet 54B in the black recording section 51, which has been wound on the winding roll 55. Accordingly, as shown in FIG. 5, no red ink is transferred onto the black ink 62 at that position on the recording sheet 7.

On the other hand, in the case where red image data on the original is read, the thermal head 52B supplies a thermal pulse to the red ink 63 of the red ink donor sheet 54R corresponding in position to that of the data thus read, so that red ink 63 for this position is transferred onto the recording sheet 7. Accordingly, when the recording sheet 7 and the red ink donor sheet 54R are separated from each other after passing through the drive roller 52D, the black image data on the original appears in black on the recording sheet and the red image data appears in red.

The recording sheet 7 is further conveyed along the path indicated by the broken line 73 into a discharging tray (not shown). When the rear edge of the recording sheet 7 passes between the back roller 52C and the drive roller 52D, the drive rollers 51D and 52D are stopped, and the supplying roll 53 stops supplying the ink donor sheet 54. Thus, the two-color copying machine has accomplished one copying operation, and is ready for the next operation.

Figure 6:
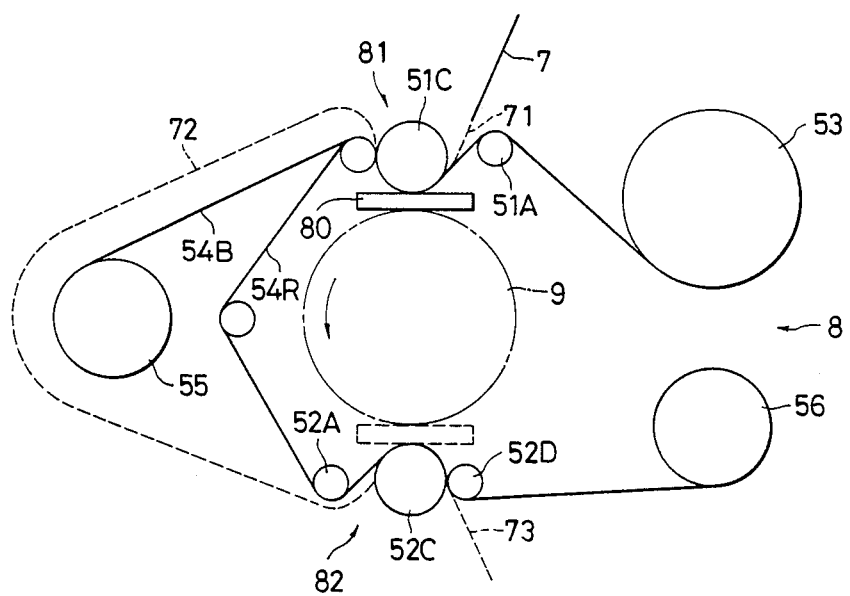
FIG. 6 is an explanatory diagram outlining the arrangement of the recording section in one modification of the two-color copying machine according to the invention.

FIG. 6 shows one modification of the above-described two-color copying machine. In FIG. 6, those components which have been previously described with reference to FIG. 2 are accordingly designated by the same reference numerals or characters. In the modification, the recording section 8 has a thermal head 80 which is used both in the black recording section 81 and in the red recording section 82. The thermal head 80 confronts the back roll 51C when data are recorded in black. After black recording has been achieved, the thermal head 80 is turned to confront the other back roll 52C as indicated by the dot chain line 9. According to the modification, it is unnecessary to use two expensive thermal heads, and accordingly the manufacturing cost of the two-color copying machine can be reduced by as much.

As is apparent from the above description, the reading section of the two-color copying machine is simplified, and therefore its reliability is improved.

While the invention has been described with reference to a two-color copying machine in which black and red are read and recorded, it goes without saying that the invention is not limited to a specific chromatic color. Furthermore, with respect to the achromatic color, a color which can be read in a range of lightnesses by changing the binary-encoding level can be freely set.

What is claimed is:

1. A two-color copying machine, comprising;
   an image sensor for twice reading an original, to form analog image signals;
   an optical system for applying image data respecting said original to said image sensor;
   complementary color filter means which, in one reading of said original, is placed in said optical system in a manner so as to absorb wavelength components of a particular chromatic color to be read;
   means for binary-encoding said analog image signals, to respectively form a first digital image signal for image data respecting an achromatic color and a second digital image signal for image data respecting the sum of said achromatic and chromatic colors;
   an achromatic recording section receiving an ink donor sheet assembly and said first digital image signal for said image data respecting said achromatic color, for recording said achromatic color on said recording sheet;
   a chromatic recording section receiving a part of said ink donor sheet assembly containing a chromatic ink layer and said second image signal respecting the sum of said achromatic and chromatic colors, for recording said chromatic color on said recording sheet; and means for preventing recording of said chromatic color over said recorded achromatic color on said recording sheet.

2. A copying machine as claimed in claim 1, wherein said optical system includes a light source and means for projecting the image of said original onto said image sensor via said complementary color filter means.

3. A copying machine as claimed in claim 2, said complementary color filter means including a transparent section and a filter section selectively placeable in said optical system, and means for placing said filter section in said optical system during said one reading of said original.

4. A copying machine as claimed in claim 1, wherein during said first scanning of said original, said complementary color filter means being placed so as to nonselectively pass light applied thereto.

5. A copying machine as claimed in claim 1, said binary-encoding means forming said first signal during said first reading of said original, and said second signal during said second reading of said original.

6. A copying machine as claimed in claim 1, said achromatic recording section comprising thermal head means selectively heated corresponding to said first signal, said ink donor sheet assembly comprising a first sheet coated with a thermally transferrable achromatic ink and a second sheet coated with a thermally transferrable chromatic ink laid one over the other, a recording paper being in contact with said coating of said first sheet in said achromatic recording section.

7. A copying machine as claimed in claim 6, including means for separating said first and second sheets following said achromatic recording section.

8. A copying machine as claimed in claim 7, said chromatic recording section receiving only said second sheet, said recording paper being in contact with said coating of said second sheet in said chromatic recording section, said chromatic recording section including a further thermal head means selectively heated corresponding to said second signal.

9. A copying machine as claimed in claim 1, said means for preventing recording of said chromatic color over said recorded achromatic color comprising an ink donor sheet assembly including a pair of separable sheets laid one on another, a first sheet comprising a base layer having an achromatic thermally transferrable ink coated thereon, and a second sheet comprising a base layer having a chromatic thermally transferrable ink coated thereon, said ink donor sheet assembly passing through said achromatic recording section such that a recording sheet contacts said achromatic ink coating and such that a thermal head assembly thereof contacts a back surface of said base layer of said second sheet, whereby during recording in said achromatic color, achromatic ink is thermally transferred to said recording sheet, while chromatic ink at positions corresponding to said transferred achromatic ink is transferred to a back surface of said base layer of said first sheet; means for separating said first and second sheets following recording at said achromatic recording section whereby only said second sheet is forwarded to said chromatic recording section, said chromatic recording section including a thermal head driven by said second image signal, said recording sheet being fed to said chromatic recording section along with said second sheet such that areas corresponding to chromatic image data are recorded in said chromatic color, whereas areas corresponding to achromatic image data correspond to portions of said second sheet whereat said chromatic thermally transferrable ink has been previously transferred to said back surface of said first sheet.

* * * * *